United States Patent
Polaganga et al.

(10) Patent No.: US 12,108,295 B2
(45) Date of Patent: Oct. 1, 2024

(54) WIRELESS DATA SERVICE OVER PUBLIC LAND MOBILE NETWORKS (PLMNs) THAT HAVE DIFFERENT PRIORITIES IN WIRELESS USER EQUIPMENT

(71) Applicant: T-MOBILE INNOVATIONS LLC, Overland Park, KS (US)

(72) Inventors: Roopesh Kumar Polaganga, Bothell, WA (US); Vishnukanth Subramaniyam, Naperville, IL (US); Deepak Nadh Tammana, Bothell, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 369 days.

(21) Appl. No.: 17/711,823

(22) Filed: Apr. 1, 2022

(65) Prior Publication Data
US 2023/0319660 A1 Oct. 5, 2023

(51) Int. Cl.
| | |
|---|---|
| *H04W 72/04* | (2023.01) |
| *H04W 36/00* | (2009.01) |
| *H04W 36/08* | (2009.01) |
| *H04W 48/16* | (2009.01) |
| *H04W 60/04* | (2009.01) |
| *H04W 84/04* | (2009.01) |

(52) U.S. Cl.
CPC ..... *H04W 36/08* (2013.01); *H04W 36/00835* (2018.08); *H04W 48/16* (2013.01); *H04W 60/04* (2013.01); *H04W 84/042* (2013.01)

(58) Field of Classification Search
CPC ........... H04W 36/08; H04W 36/00835; H04W 36/16; H04W 36/00837; H04W 48/16; H04W 60/04; H04W 84/042; H04W 8/12; H04W 8/18
See application file for complete search history.

(56) References Cited

U.S. PATENT DOCUMENTS

| | | | |
|---|---|---|---|
| 8,682,327 B2 | 3/2014 | Tenny et al. | |
| 8,989,742 B2 | 3/2015 | Ramachandran et al. | |
| 9,241,302 B2 | 1/2016 | Ramachandran et al. | |
| 9,288,747 B2 | 3/2016 | Subramanian et al. | |
| 9,351,212 B2 | 5/2016 | Zhao et al. | |
| 9,357,469 B2 | 5/2016 | Smith et al. | |
| 9,467,921 B2 | 10/2016 | Sirotkin et al. | |
| 10,194,357 B2 | 1/2019 | Lee et al. | |
| 2008/0020770 A1* | 1/2008 | Hofmann | H04W 36/30 455/438 |

(Continued)

*Primary Examiner* — Mahbubul Bar Chowdhury

(57) ABSTRACT

A wireless communication network serves a wireless User Equipment (UE) over a higher-priority Public Land Mobile Network (PLMN) and a lower-priority PLMN. The UE switches between the higher-priority PLMN at a wireless access node and the lower-priority PLMN at another access node. A network controller detects the excessive PLMN-switching and signals the UE to avoid the higher-priority PLMN until the wireless UE returns from idle mode. The wireless access node exchanges additional communications with the wireless UE over the lower-priority PLMN until the wireless UE enters the idle mode. The wireless access node may exchange additional communications with the wireless UE over the higher-priority PLMN after the UE returns from idle mode.

20 Claims, 12 Drawing Sheets

(56) References Cited

U.S. PATENT DOCUMENTS

| | | | |
|---|---|---|---|
| 2010/0285772 A1* | 11/2010 | Colonna | G08G 1/0104 |
| | | | 455/405 |
| 2015/0119028 A1 | 4/2015 | Zhang | |
| 2016/0337957 A1* | 11/2016 | Gonsalves | H04W 8/24 |
| 2017/0070923 A1* | 3/2017 | Li | H04W 36/0066 |
| 2020/0178196 A1 | 6/2020 | Wang et al. | |
| 2023/0156549 A1* | 5/2023 | Tsuda | H04W 36/30 |
| | | | 455/440 |
| 2023/0164685 A1* | 5/2023 | Wu | H04W 48/04 |
| | | | 455/434 |
| 2023/0284108 A1* | 9/2023 | Abtin | H04W 36/0033 |
| | | | 370/331 |

* cited by examiner

WIRELESS DATA SERVICE OVER PUBLIC LAND MOBILE NETWORKS (PLMNs) THAT HAVE DIFFERENT PRIORITIES IN WIRELESS USER EQUIPMENT

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless network elements comprise Access and Mobility Management Functions (AMFs), User Plane Functions (UPFs), and the like. The wireless access nodes and network elements are further grouped into Public Land Mobile Networks (PLMNs). Some PLMNs may have dedicated wireless access nodes and network elements. Other PLMNs may have share some wireless access nodes and network elements.

As one of the wireless user devices moves about, the wireless access nodes handover the wireless user device to maintain adequate received signal strength at the wireless user device. In some cases, the wireless communication network redirects the wireless user device from one wireless access node to another. In other cases, the wireless user device detaches from one wireless access node and attaches to another wireless access node. In these handovers, redirections, and reattachments, the wireless user device may change PLMNs since some of the wireless access nodes do not support all of the PLMNs that the wireless user device may use. The wireless user device may repeatedly change PLMNs when rapidly changing wireless access nodes due to varying radio coverage and user movement. The wireless user device reports its current PLMN to the wireless communication network over network signaling like Tracking Area Update (TAU) messages.

The wireless communication network controls the PLMNs that are used by the wireless user device. The wireless user device maintains a Handover Restriction List (HRL) that indicates desired PLMNs in priority order. The HRL typically has a Home PLMN (H-PLMN) as the top priority, followed by Equivalent PLMNs (E-PLMNs), and then other PLMNs follow in priority order. To avoid high-roaming charges in an expensive PLMN, the wireless communication network edits the HRL in the wireless user device to temporarily remove the expensive PLMN from the HRL until the wireless user device returns from idle mode.

Unfortunately, the wireless communication networks do not effectively serve the wireless user devices over multiple PLMNs. Moreover, the wireless communication networks do not efficiently inhibit excessive PLMN switching that consumes network resources and delays service delivery.

TECHNICAL OVERVIEW

A wireless communication network serves a wireless User Equipment (UE) over a higher-priority Public Land Mobile Network (PLMN) and a lower-priority PLMN. The UE switches between the higher-priority PLMN at a wireless access node and the lower-priority PLMN at another access node. A network controller detects the excessive PLMN-switching and signals the UE to avoid the higher-priority PLMN until the wireless UE returns from idle mode. The wireless access node exchanges additional communications with the wireless UE over the lower-priority PLMN until the wireless UE enters the idle mode. The wireless access node may exchange additional communications with the wireless UE over the higher-priority PLMN after the UE returns from idle mode.

DETAILED DESCRIPTION

Figure 1:
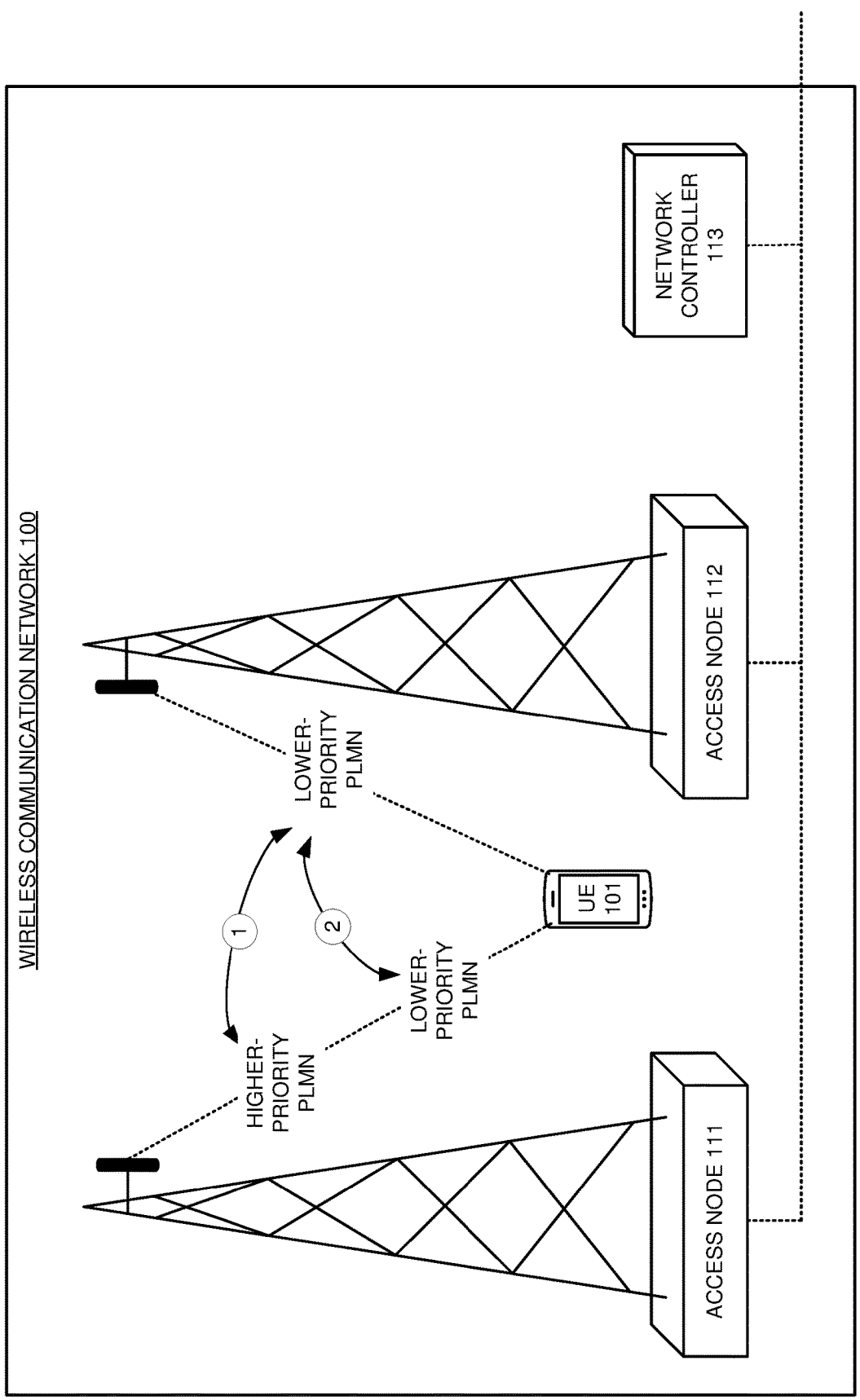
FIG. 1 illustrates an exemplary wireless communication network to serve a wireless User Equipment (UE) over a higher-priority Public Land Mobile Network (PLMN) and a lower-priority PLMN.

FIG. 1 illustrates exemplary wireless communication network 100 to serve wireless User Equipment (UE) 101 over a higher-priority Public Land Mobile Network (PLMN) and a lower-priority PLMN. Wireless communication network 100 comprises UE 101, wireless access nodes 111-112, and network controller 113. Wireless access node 111 supports the higher-priority PLMN and the lower-priority PLMN and could be a Fifth Generation New Radio (5GNR) macrocell base station. Wireless access node 112 supports the lower-priority PLMN but not the higher-priority PLMN and could be a 5GNR femtocell hot-spot. UE 101 tries to use the higher-priority PLMN when available. Network controller 113 comprises an Access and Mobility Management Function (AMF), Mobility Management Entity (MME), and/or some other network elements. UE 101 comprises a computer, phone, sensor, vehicle, robot, or some other data appliance with wireless communication circuitry. Exemplary wireless data services that are served to UE 101 include machine-control, internet-access, media-streaming, social-networking, or some other wireless data product. The number of UEs and access nodes shown on FIG. 1 is restricted for clarity and wireless communication network 100 typically includes many more UEs and access nodes than shown.

Various examples of network operation and configuration are described herein. In some examples, wireless UE 101 and wireless access node 111 exchange wireless communications over the higher-priority PLMN. Wireless UE 101 and wireless access node 112 exchange wireless communications over the lower-priority PLMN. As indicated on FIG. 1 by the first arrows, wireless UE 101 switches back-and-forth between the higher-priority PLMN at wireless access node 111 and the lower-priority PLMN at wireless access node 112. Eventually, network controller 113 detects excessive PLMN-switching between the higher-priority PLMN and the lower-priority PLMN by wireless UE 101, and in response, network controller 113 signals wireless UE 101 to avoid the higher-priority PLMN until wireless UE 101 returns from idle mode. Wireless UE 101 and wireless access nodes 111-112 now exchange wireless communications over the lower-priority PLMN to mitigate the excessive PLMN-switching. As indicated on FIG. 1 by the second arrows, wireless UE 101 switches back-and-forth between wireless access node 111 and wireless access node 112 but uses the lower-priority PLMN at both. After the wireless UE 101 returns from idle mode, UE 101 and wireless access node 111 may again exchange wireless communications over the higher-priority PLMN. Advantageously, wireless communication network 100 effectively serves wireless UE 101 over multiple PLMNs. Moreover, wireless communication network 100 efficiently inhibits excessive PLMN switching to conserve network resources and speed-up service delivery.

In some examples, UE 101 maintains a PLMN list that has the higher-priority PLMN and the lower-priority PLMN. In some examples, the higher-priority PLMN comprises a Home PLMN (H-PLMN) and the lower-priority PLMN comprises an Equivalent PLMN (E-PLMN). In other examples, the higher-priority PLMN and the lower-priority PLMN comprise E-PLMNs with different priorities in the PLMN list. Other types of PLMNs with different priorities could be used as well. In some examples, the signaling from network controller 113 to wireless UE to avoid the higher-priority PLMN until the wireless UE returns from the idle mode comprises a Handover Restriction List (HRL) update with an instruction to remove the higher-priority PLMN from the HRL until wireless UE 101 returns from idle mode. In some examples, the detection of the excessive PLMN-switching by network controller 113 comprises processing Tracking Area Updates (TAUs) from the wireless UE 101 that indicate its current PLMN. The detection of excessive PLMN-switching by network controller 113 may comprise a comparison of a PLMN-switching threshold to the number of PLMN-switches between the higher-priority PLMN and the lower-priority PLMN by wireless UE 101 during a measurement time period. For example, two PLMN changes by UE 101 within 5 seconds could trigger the use of the lower-priority PLMN by the UE 101 at both wireless access nodes 111-112.

UE 101 and wireless access nodes 111-112 wirelessly communicates over radio channels or some other wireless communication media. The wireless communications use technologies like Institute of Electrical and Electronic Engineers (IEEE) 802.11 (WIFI), Internet-of-Things (IoT), Bluetooth Low Energy (BLE), Fifth Generation New Radio (5GNR), Long Term Evolution (LTE), Low Power Wide Area Network (LP-WAN), and Ultra-Wide-Band (UWB). Wireless access nodes 111-112 and network controller 113 communicate over network connections that comprise metallic wiring, glass fibers, radio channels, or some other communication media. The network connections may use WIFI, IoT, Bluetooth, 5GNR, LTE, LP-WAN, UWB, IEEE 802.3 (ETHERNET), Internet Protocol (IP), Time Division Multiplex (TDM), Data Over Cable System Interface Specification (DOCSIS), Synchronous Optical Network (SONET), virtual switching, inter-processor communication, bus interfaces, and/or some other data communication protocols. Wireless UE 101 and wireless access nodes 111-112 comprise radios. UE 101, nodes 111-112, and controller 113 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, relay applications, network applications, radio applications, and network functions. The microprocessors retrieve the software from the memories and execute the software to drive the operation of wireless communication network 100 as described herein.

Figure 2:
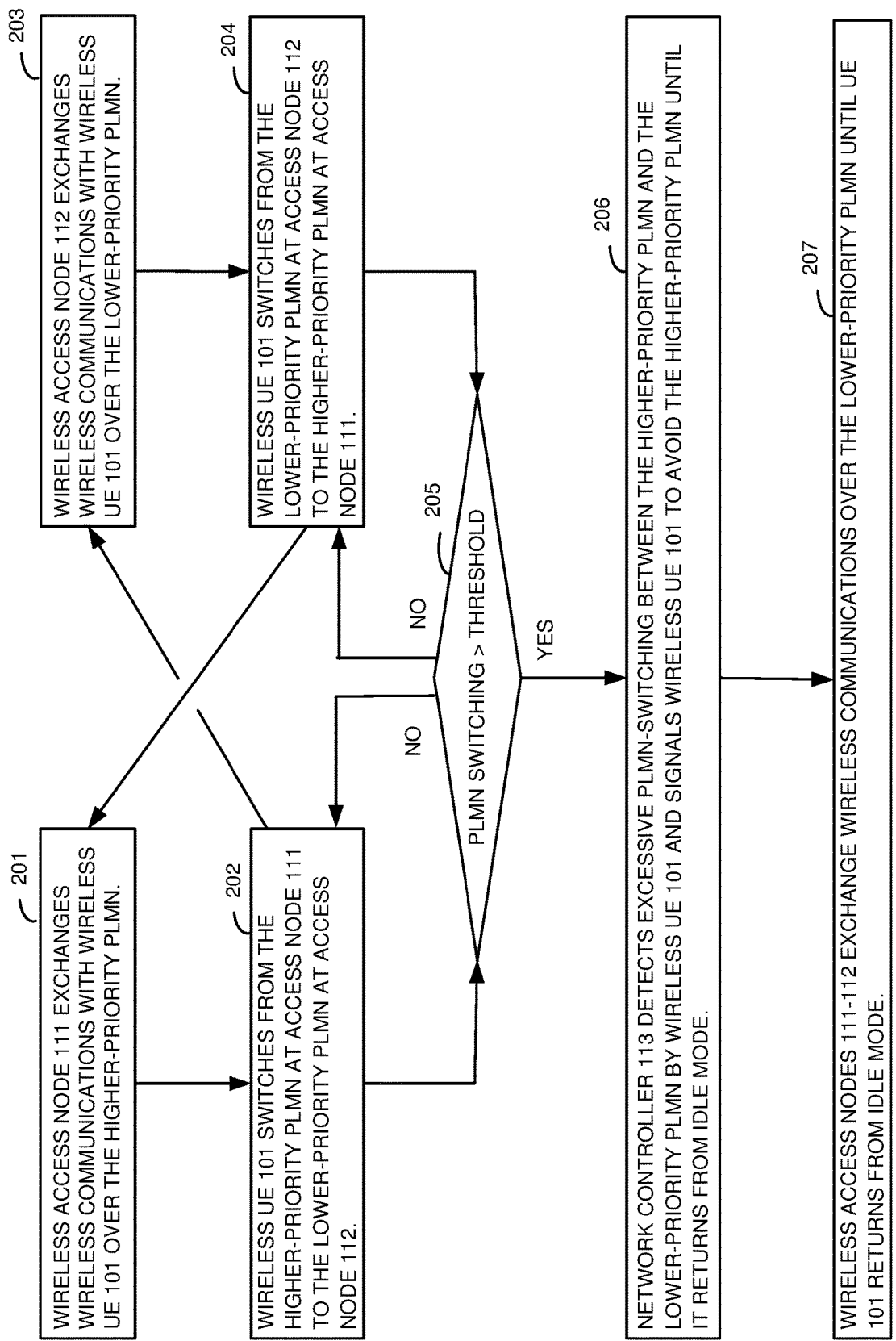
FIG. 2 illustrates an exemplary operation of the wireless communication network to serve the wireless UE over the higher-priority PLMN and the lower-priority PLMN.

FIG. 2 illustrates an exemplary operation of wireless communication network 100 to serve wireless UE 101 over the higher-priority PLMN and the lower-priority PLMN. The operation may vary in other examples. Wireless access node 111 exchanges wireless communications with wireless UE 101 over the higher-priority PLMN (201). Wireless UE 101 switches from the higher-priority PLMN at wireless access node 111 to the lower-priority PLMN at wireless access node 112 (202). Wireless access node 112 exchanges wireless communications with wireless UE 101 over the lower-priority PLMN (203). Wireless UE 101 switches from the lower-priority PLMN at wireless access node 112 to the higher-priority PLMN at wireless access node 111 (204). In this example, the operation in boxes 201-202 occurs before the operation in boxes 203-204, but in other examples, the operation in boxes 203-204 may occur before the operation in boxes 201-202. The operation in boxes 201-204 continues until the recent amount of PLMN switching exceeds a threshold (205) and network controller 113 detects the excessive PLMN-switching between the higher-priority PLMN and the lower-priority PLMN by wireless UE 101 (206). In response to the detection, network controller 113 signals wireless UE 101 to avoid the higher-priority PLMN until UE 101 returns from idle mode (206). Wireless access nodes 111-112 exchange wireless communications with UE 101 over the lower-priority PLMN until UE 101 returns from idle mode (207).

Figure 3:
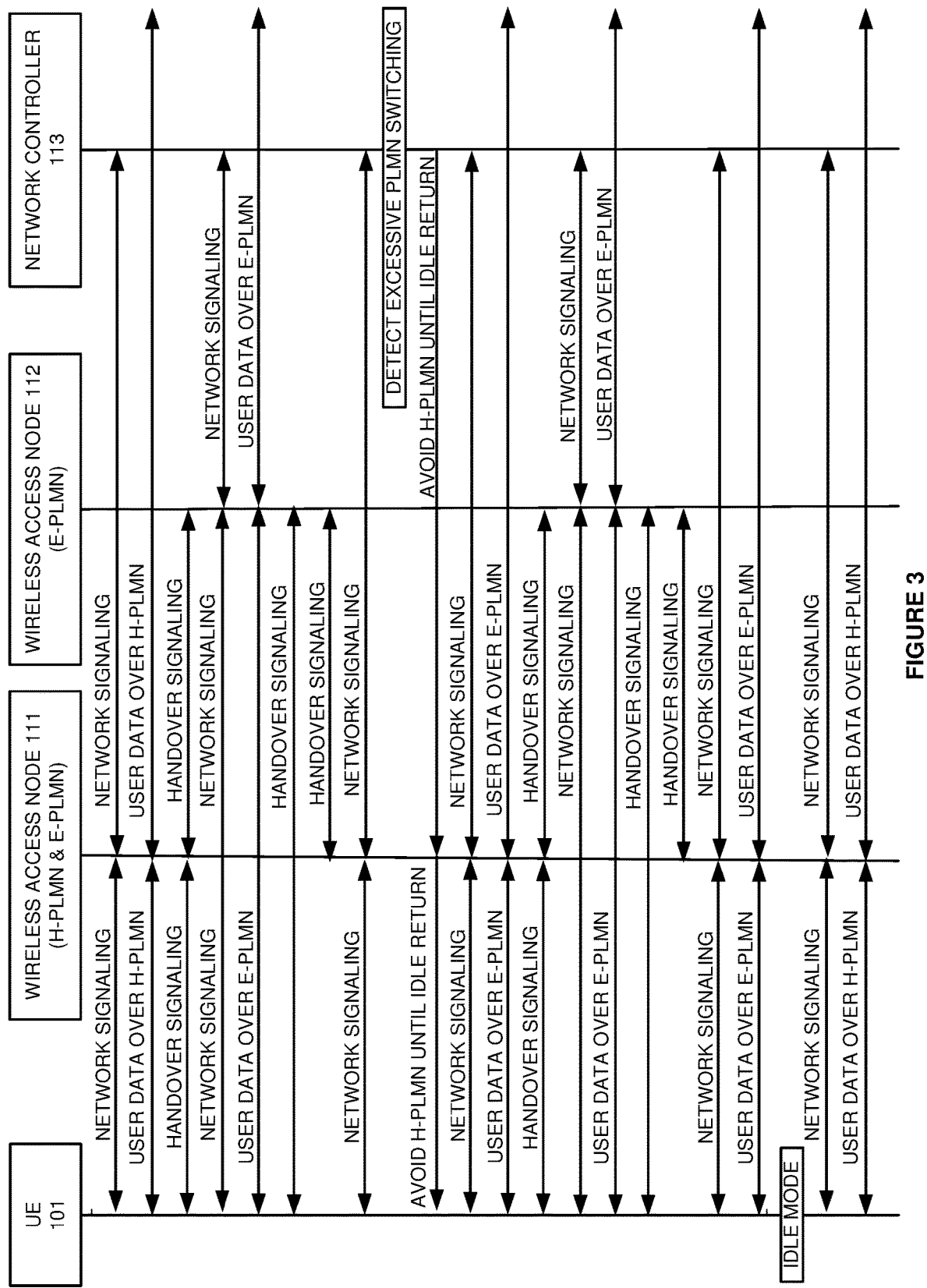
FIG. 3 illustrates an exemplary operation of the wireless communication network to serve the wireless UE over a Home PLMN (H-PLMN) and an Equivalent PLMN (E-PLMN).

FIG. 3 illustrates an exemplary operation of wireless communication network 100 to serve wireless UE 101 over a Home PLMN (H-PLMN) and an Equivalent PLMN (E-PLMN). The operation may vary in other examples. For UE 101, the H-PLMN has a higher priority than the E-PLMN. To establish wireless data service, wireless UE 101 and wireless access node 111 exchange network signaling. The network signaling from wireless access node 111 to UE 101 indicates that node 111 supports the H-PLMN and the E-PLMN. The network signaling from UE 101 back to wireless access node 111 selects the H-PLMN because it has a higher priority than the E-PLMN to UE 101. Wireless access node 111 and network controller 113 exchange network signaling that indicates the selected H-PLMN to establish service for UE 101. In response to the network signaling, wireless UE 101 and wireless access node 111 exchange user data over the H-PLMN. Wireless access node 111 exchanges the user data with external systems—typically over a network core that is omitted for clarity.

Wireless UE 101 and wireless access node 111 exchange handover signaling for a UE-switch to wireless access node 112 due to a signal strength difference or some other trigger. For example, UE 101 may report received signal strength for wireless access nodes 111-112, and wireless access node 111 may detect a decibel-difference that drives a UE handover to wireless access node 112. Wireless access nodes 111-112 exchange handover signaling. To reestablish the wireless data service, wireless UE 101 and wireless access node 112 exchange network signaling. The network signaling from wireless access node 112 to UE 101 indicates that node 112 supports the E-PLMN but not the H-PLMN. The network signaling from UE 101 back to wireless access node 112 selects the E-PLMN because it has the highest-priority of the available PLMNs. Wireless access node 112 and network controller 113 exchange network signaling that indicates the selected E-PLMN to reestablish the service for UE 101. In response to the network signaling, wireless UE 101 and wireless access node 112 exchange user data over the E-PLMN. Wireless access node 111 exchanges the user data with external systems—typically over the network core.

Wireless UE 101 and wireless access node 111 exchange handover signaling for a UE-switch to wireless access node 112 due to a signal strength difference or some other trigger. For example, UE 101 may report received signal strength for wireless access nodes 111-112, and wireless access node 111 may detect a decibel-difference that drives a UE handover to wireless access node 112. Wireless access nodes 111-112 exchange handover signaling. To reestablish the wireless data service, wireless UE 101 and wireless access node 112 exchange network signaling. The network signaling from wireless access node 112 to UE 101 indicates that node 112 supports the E-PLMN but not the H-PLMN. The network signaling from UE 101 back to wireless access node 112 selects the E-PLMN because it has the highest-priority of the available PLMNs. Wireless access node 112 and network controller 113 exchange network signaling that indicates the selected E-PLMN to reestablish the service for UE 101. The network signaling from UE 101 to network controller 113 over wireless access node 112 may include a Tracking Area Update (TAU) that indicates the E-PLMN. In response to the network signaling, wireless UE 101 and wireless access node 112 exchange user data over the E-PLMN. Wireless access node 112 exchanges the user data with external systems.

Wireless UE 101 and wireless access node 112 exchange handover signaling for a UE-switch back to wireless access node 111 due to a signal strength difference or some other trigger. For example, UE 101 may report received signal strength for wireless access nodes 111-112, and wireless access node 112 may detect a decibel-difference that drives a UE handover to wireless access node 111. Wireless access nodes 111-112 exchange handover signaling. To reestablish the wireless data service, wireless UE 101 and wireless access node 111 exchange network signaling. The network signaling from wireless access node 111 to UE 101 indicates that node 111 supports the H-PLMN and the E-PLMN. The network signaling from UE 101 back to wireless access node 112 selects the H-PLMN because it has the highest-priority. Wireless access node 111 and network controller 113 exchange network signaling that indicates the selected H-PLMN to reestablish the service for UE 101. The network signaling from UE 101 to network controller 113 over wireless access node 111 may include a TAU that indicates the H-PLMN.

Network controller 113 detects excessive PLMN switching because UE 101 has switched PLMNs twice in a few seconds, so network controller 113 signals wireless UE 101 over wireless access node 111 to avoid the higher-priority H-PLMN until a return from idle mode. This signaling could be an HRL update. To reestablish the wireless data service, wireless UE 101 and wireless access node 111 exchange network signaling. The network signaling from UE 101 back to wireless access node 112 selects the E-PLMN because it has the highest-priority since the H-PLMN is temporarily excluded. Wireless access node 111 and network controller 113 exchange network signaling that indicates the selected E-PLMN to reestablish the service for UE 101. The network signaling from UE 101 to network controller 113 over wireless access node 111 may include another TAU that indicates the E-PLMN.

Wireless UE 101 and wireless access node 111 exchange handover signaling for a UE-switch to wireless access node 112 due to a signal strength difference or some other trigger. Wireless access nodes 111-112 exchange handover signaling. Wireless UE 101 and wireless access node 112 exchange network signaling. The network signaling from UE 101 to wireless access node 112 selects the E-PLMN because it has the highest-priority of the available PLMNs. Wireless access node 112 and network controller 113 exchange network signaling that indicates the selected E-PLMN to reestablish the service for UE 101. In response to the network signaling, wireless UE 101 and wireless access node 112 exchange user data over the E-PLMN. Wireless access node 112 exchanges the user data with external systems.

Wireless UE 101 and wireless access node 112 exchange handover signaling for a UE-switch back to wireless access node 111 due to a signal strength difference or some other trigger. Wireless access nodes 111-112 exchange handover signaling. To reestablish the wireless data service, wireless UE 101 and wireless access node 111 exchange network signaling. The network signaling from wireless access node 111 to UE 101 indicates that node 111 supports the H-PLMN and the E-PLMN. The network signaling from UE 101 back to wireless access node 112 selects the E-PLMN because it has the highest-priority since the H-PLMN is temporarily excluded. Wireless access node 111 and network controller 113 exchange network signaling that indicates the selected E-PLMN to reestablish the service for UE 101. Wireless access node 111 exchanges the user data with external systems.

Eventually, wireless UE 101 enters idle mode. Wireless UE 101 returns from idle mode on wireless access node 111. To establish wireless data service, wireless UE 101 and wireless access node 111 exchange network signaling. The network signaling from wireless access node 111 to UE 101 indicates that node 111 supports the H-PLMN and the E-PLMN. The network signaling from UE 101 back to wireless access node 111 selects the H-PLMN because it has a higher priority than the E-PLMN and is no longer under the temporary restriction. Wireless access node 111 and network controller 113 exchange network signaling that indicates the selected H-PLMN to establish service for UE 101. In response to the network signaling, wireless UE 101 and wireless access node 111 exchange user data over the H-PLMN. Wireless access node 111 exchanges the user data with external systems.

Figure 4:
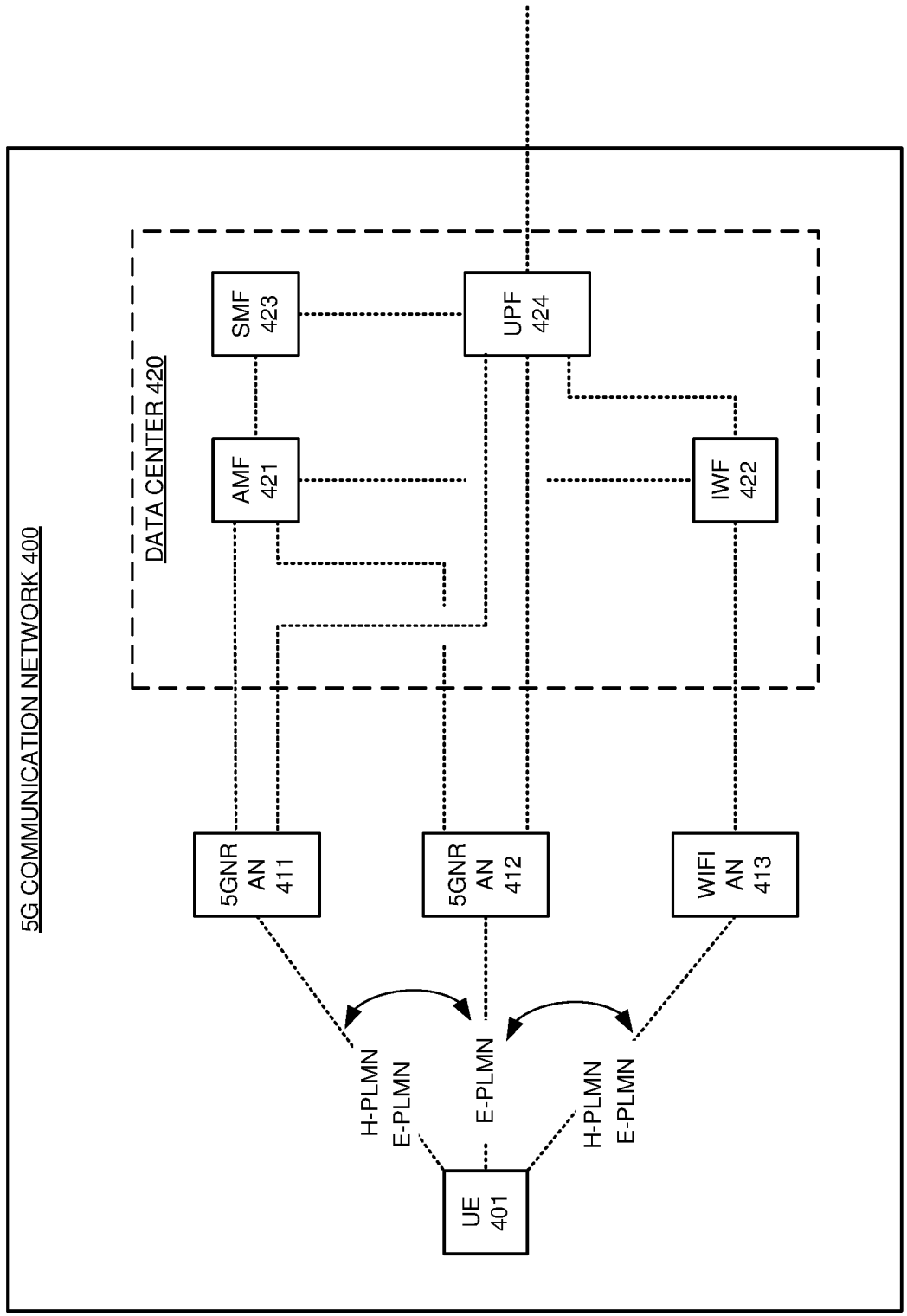
FIG. 4 illustrates an exemplary Fifth Generation (5G) communication network to serve a wireless UE over an H-PLMN and an E-PLMN.

FIG. 4 illustrates an exemplary Fifth Generation (5G) communication network 400 to serve wireless UE 401 over an H-PLMN and an E-PLMN. 5G communication network 400 comprises an example of wireless communication network 100, although network 100 may differ. 5G communication network 400 comprises: wireless UE 401, 5GNR Access Nodes (ANs) 411-412, WIFI AN 403, and network data center 430. Network data center 430 comprises Access and Mobility Management Function (AMF) 421, Interworking Function (IWF) 422, Session Management Function (SMF) 423, User and Plane Function (UPF) 424. Data center 430 is simplified for clarity and typically includes additional network elements like Network Repository Function (NRF) and Unified Data Management (UDM).

Wireless UE 401 and AMF 421 exchange network signaling over 5GNR ANs 411-412. Wireless UE 401 and external systems exchange user data over 5GNR ANs 411-412 and UPF 424. Wireless UE 401 and AMF 421 may also exchange network signaling over WIFI AN 413 and IWF 422. Wireless UE 401 and external systems may also exchange user data over WIFI AN 413, IWF 422, and UPF 424.

UE 401 is configured with a Handover Restriction List (HRL) that lists PLMNs in a priority order with the H-PLMN as the highest priority and the E-PLMN as the second highest priority. Although the H-PLMN and E-PLMN are used in this example, the same technique could be used for any two PLMNs in the HRL such as a pair of E-PLMNs. In this example, 5GNR AN 511 and IWF 422 support both the higher-priority H-PLMN and the lower-priority E-PLMN while 5GNR AN 512 only supports the lower-priority E-PLMN. Wireless UE 401 requests the H-PLMN when available and requests the E-PLMN when the H-PLMN is not available.

Due to UE mobility and the resulting signal strength differences, wireless UE 401 switches among ANs 411-413, and in response, UE 401 switches between the H-PLMN and the E-PLMN. Wireless UE 401 and AMF 421 exchange Tracking Area Update (TAU) signaling that indicates the PLMN switches by UE 401. In response to the PLMN-switches, AMF 421 checks PLMN-switching by UE 401 in the past few seconds. When the number of PLMN-switches in the past few seconds by UE 401 exceeds a PLMN-switching threshold for the time-frame like 2 or 3, AMF 401 signals UE 401 to temporarily remove the higher-priority H-PLMN from the HRL until a return from idle mode. Now when wireless UE 401 switches among ANs 411-413, UE 401 uses the lower-priority E-PLMN and does not switch between the higher-priority H-PLMN and the lower-priority E-PLMN. Eventually, UE 401 enters idle mode and then returns from idle mode. The temporary restriction on the higher-priority H-PLMN is gone from the HRL. UE 401 will switch between the H-PLMN and the E-PLMN unless the PLMN-switching threshold is reached again in the given timeframe.

In some examples, AMF 421 also checks recent AN-switching by UE 401 in response to handovers, redirections, and reattachments. When the number of AN-switches in the past few seconds by UE 401 exceeds an AN-switching threshold for the time-frame, AMF 401 signals UE 401 to temporarily block a change from the current AN to the last AN until a return from idle mode.

Figure 5:
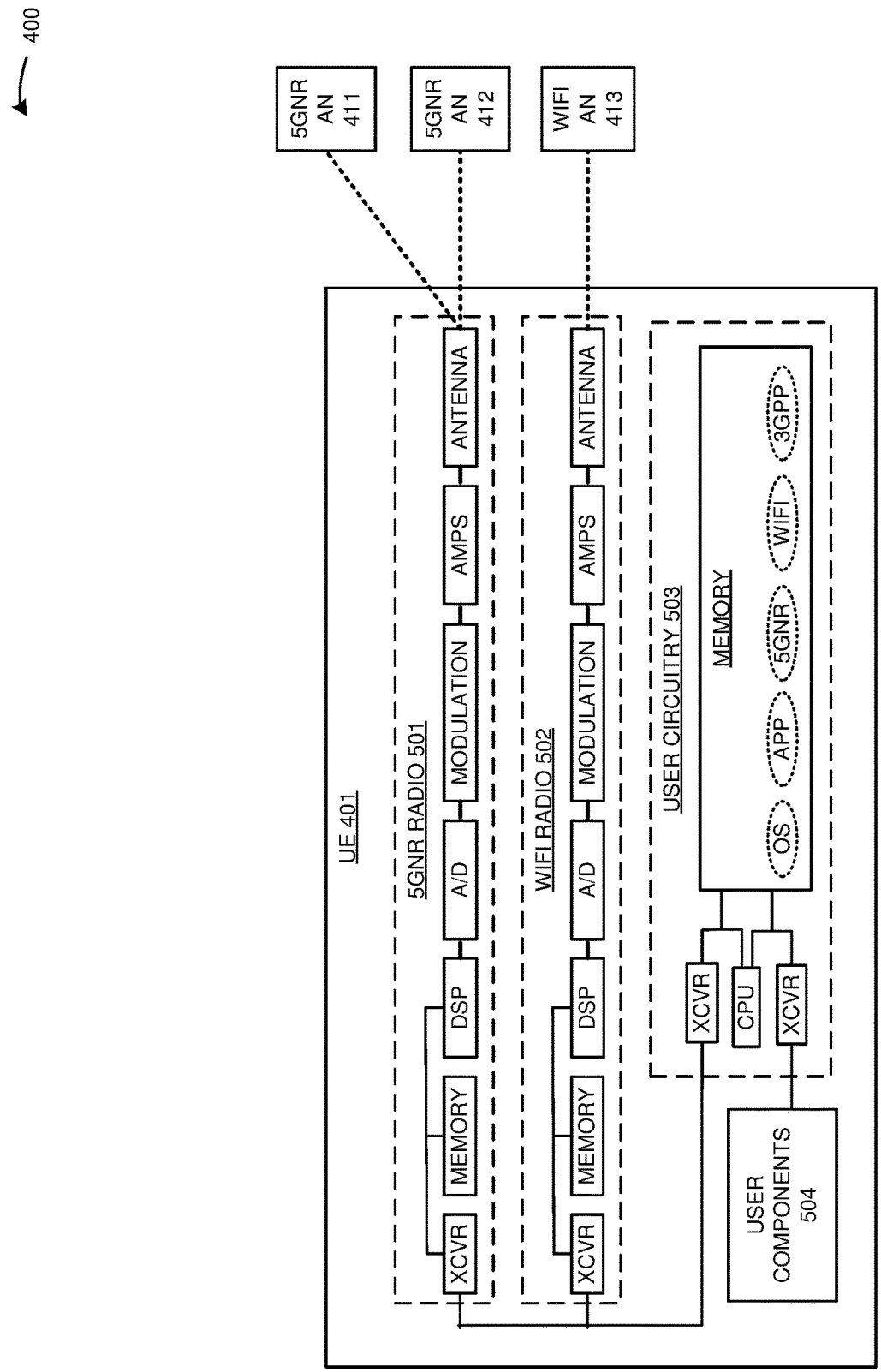
FIG. 5 illustrates an exemplary wireless UE in the 5G communication network.

FIG. 5 illustrates exemplary wireless UE 401 in 5G communication network 400. Wireless UE 401 comprises an example of wireless UE 101, although UE 101 may differ. Wireless UE 401 comprises radio 501, user circuitry 502, and user components 503. User components 503 comprise sensors, controllers, displays, or some other user apparatus that generates and/or consumes user data. Radio 501 comprises an antenna, amplifiers, filters, modulation, analog-to-digital interfaces, DSP, memory, and transceivers that are coupled over bus circuitry. User circuitry 502 comprises memory, CPU, transceivers (XCVRs) that are coupled over bus circuitry. The memory in user circuitry 502 stores an operating system (OS), user application (APP), and communication application (COM). The communication application directs the wireless exchange of relay application data with the relay application in UE 410. The transceiver in radio 501 is coupled to a transceiver in user circuitry 502. A transceiver in user circuitry 502 is coupled to user components 503. The CPU in user circuitry 502 executes the operating system, user application, and network applications to exchange network signaling and user data with ANs 411-413 over radios 501-502. When executed, the Radio Resource Control (RRC) in the 3GPP application handles PLMN selection and usage as described herein.

Figure 6:
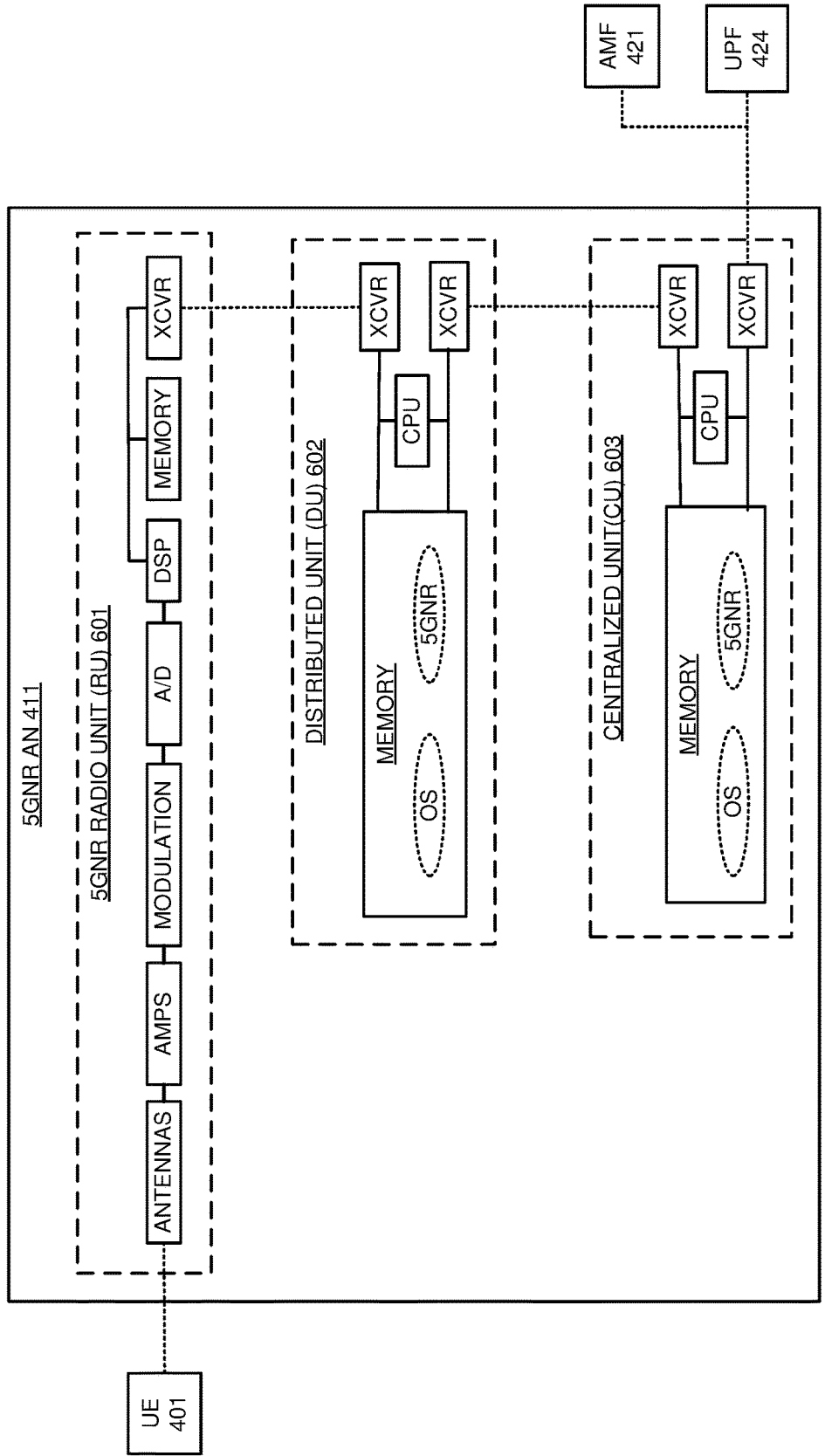
FIG. 6 illustrates an exemplary 5G New Radio (NR) Access Node (AN) in the 5G communication network.

FIG. 6 illustrates exemplary 5G New Radio (NR) Access Node (AN) 411 in 5G communication network 400. 5GNR AN 411 comprises an example of ANs 111-112 and 412, although ANs 111-112 and 412 may differ. 5GNR AN 411 comprises 5GNR Radio Unit (RU) 601, Distributed Unit (DU) 602, and Centralized Unit (CU) 603. 5GNR RU 601 comprises antennas, amplifiers, filters, modulation, analog-to-digital interfaces, DSP, memory, radio applications, and transceivers that are coupled over bus circuitry. DU 602 comprises memory, CPU, user interfaces and components, and transceivers that are coupled over bus circuitry. The memory in DU 602 stores operating system and 5GNR network applications for physical layer, media access control, and radio link control. CU 603 comprises memory, CPU, and transceivers that are coupled over bus circuitry. The memory in CU 603 stores an operating system and 5GNR network applications for packet data convergence protocol, service data adaption protocol, and radio resource control. The antennas in 5GNR RU 601 are wirelessly coupled to UE 401 over 5GNR links. Transceivers in 5GNR RU 601 are coupled to transceivers in DU 602. Transceivers in DU 602 are coupled to transceivers in CU 603. Transceivers in CU 603 are coupled AMF 421 and UPF 424. The DSP and CPU in RU 601, DU 602, and CU 603 execute the radio applications, operating systems, and network applications to exchange data and signaling with UE 401, AMF 421, and UPF 424.

Figure 7:
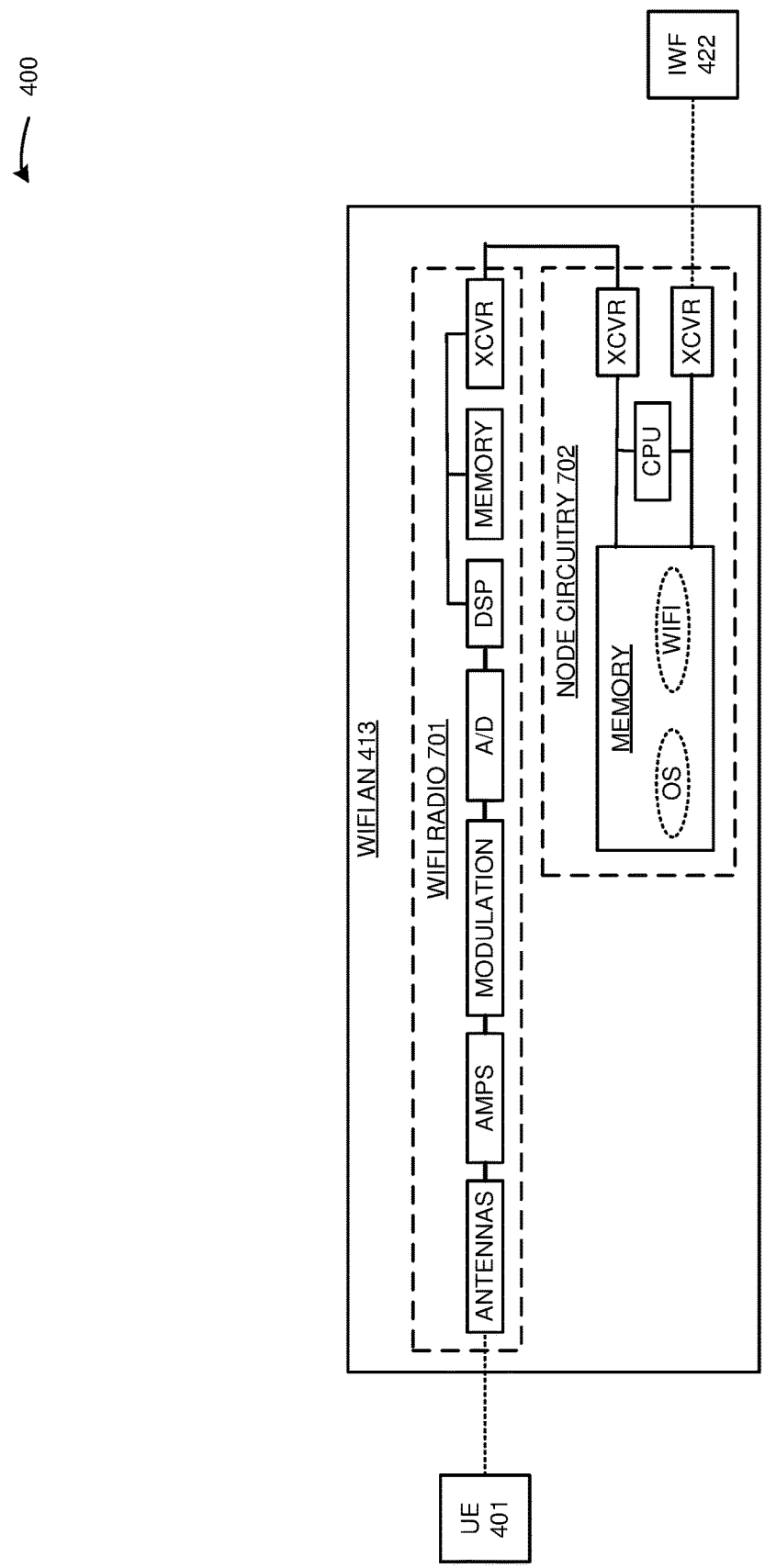
FIG. 7 illustrates an exemplary IEEE 802.11 (WIFI) AN in the 5G communication network.

FIG. 7 illustrates an exemplary IEEE 802.11 (WIFI) AN 413 in 5G communication network 400. WIFI AN 413 comprises an examples of ANs 111-112, although ANs 111-112 may differ. WIFI AN 413 comprises WIFI radio 701 and node circuitry 702. WIFI radio 701 comprises antennas, amplifiers, filters, modulation, analog-to-digital interfaces, DSP, memory, and transceivers that are coupled over bus circuitry. Node circuitry 702 comprises memory, CPU, user interfaces and components, and transceivers that are coupled over bus circuitry. The memory in node circuitry 702 stores an operating system and network applications for WIFI. The antennas in WIFI radio 701 are wirelessly coupled to UE 401 over a WIFI link. Transceivers in WIFI radio 701 are coupled to transceivers in node circuitry 702. Transceivers in node circuitry 702 are coupled to transceivers in IWF 422. The CPU in node circuitry 702 executes the operating system and network applications to exchange signaling and data between UE 410 and IWF 422.

Figure 8:
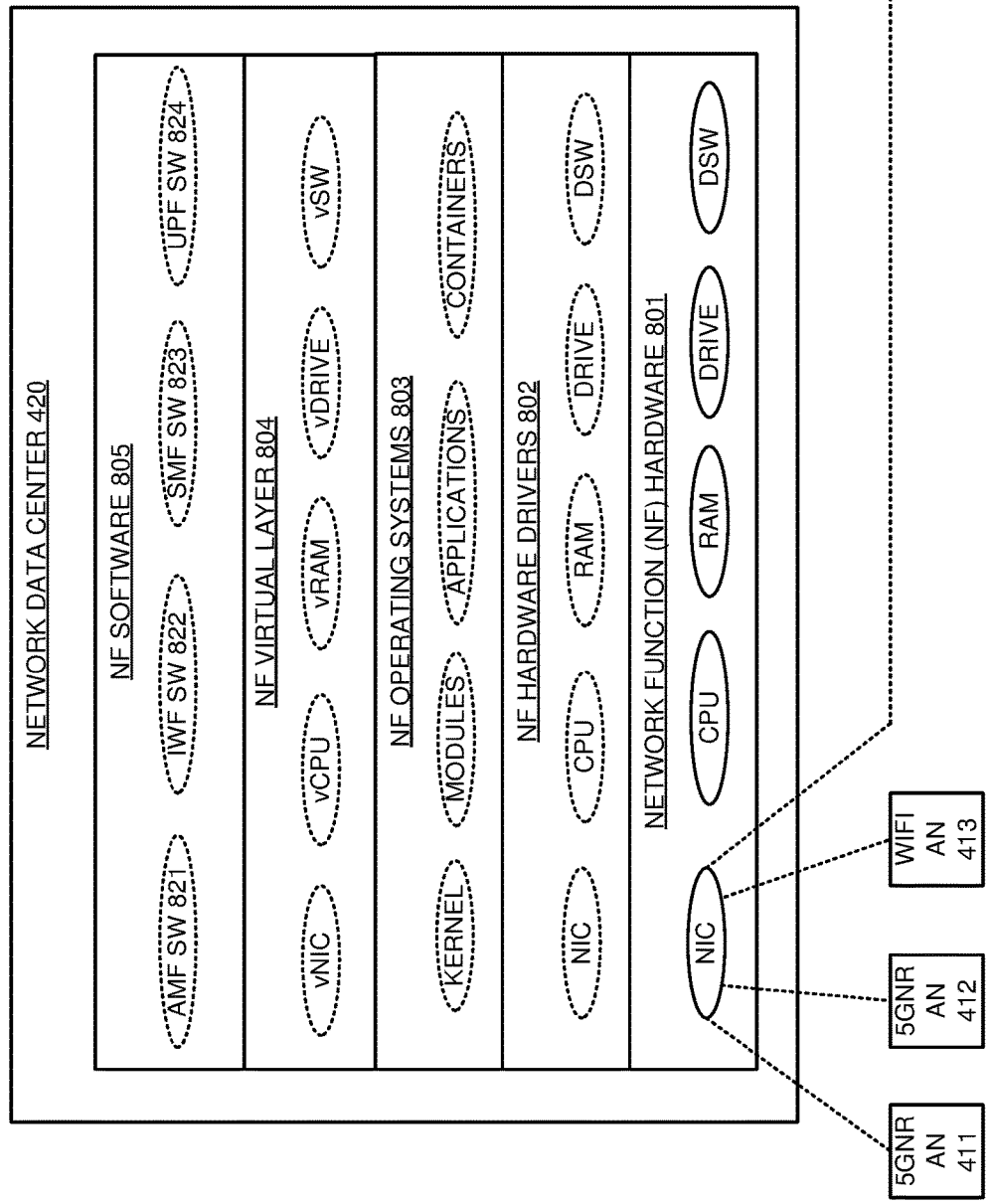
FIG. 8 illustrates an exemplary data center in the 5G communication network.

FIG. 8 illustrates exemplary data center 420 in 5G communication network 400. Network data center 420 comprises an example of network controller 113, although controller 113 may differ. Network data center 420 comprises Network Function (NF) hardware 801, NF hardware drivers 802, NF operating systems 803, NF virtual layer 804, and NF Software (SW) 805. NF hardware 801 comprises Network Interface Cards (NICs), CPU, RAM, Flash/Disk Drives (DRIVE), and Data Switches (DSW). NF hardware drivers 802 comprise software that is resident in the NIC, CPU, RAM, DRIVE, and DSW. NF operating systems 803 comprise kernels, modules, and applications that form containers for virtual layer and NF software execution. NF virtual layer 804 comprises vNIC, vCPU, vRAM, vDRIVE, and vSW. NF SW 805 comprises AMF SW 821, IWF SW 822, SMF SW 823, and UPF SW 824. Other NF SW like Network Repository Function (NRF) SW are typically present but are omitted for clarity. Network data center 420 may be located at a single site or be distributed across multiple geographic locations. The NIC in NF hardware 801 are coupled to ANs 411-413 and external data systems. NF hardware 801 executes NF hardware drivers 802, NF operating systems 803, NF virtual layer 804, and NF SW 805 to form and operate AMF 421, IWF 422, SMF, 423, and UPF 424. AMF 421 manages excessive PLMN-switching as described herein.

Figure 9:
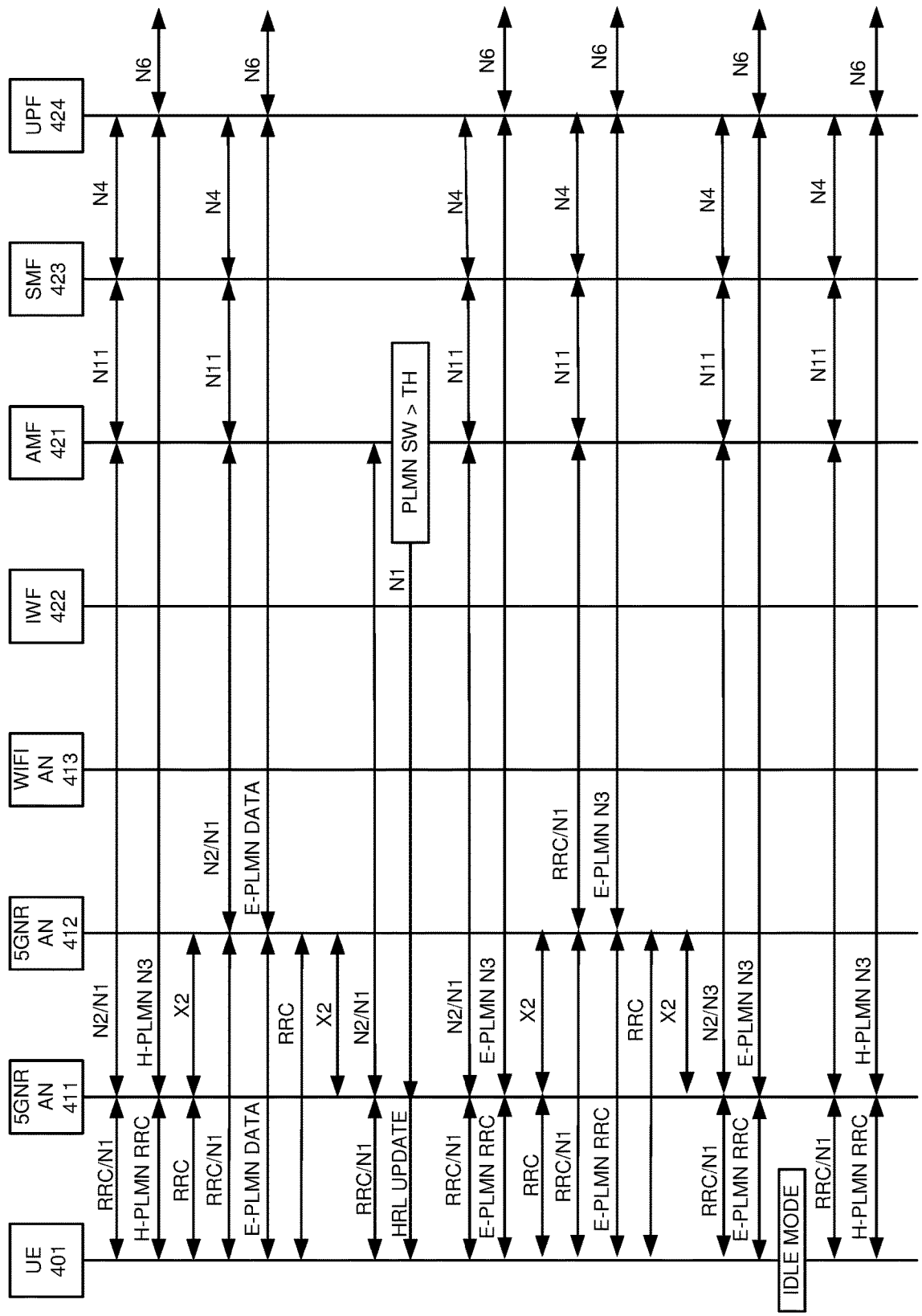
FIG. 9 illustrates an exemplary operation of the 5G communication network to serve the wireless UE over the H-PLMN and the E-PLMN.

FIG. 9 illustrates an exemplary operation of 5G communication network 400 to serve wireless UE 401 over the H-PLMN and the E-PLMN. The operation may vary in other examples. Wireless UE 401 and 5GNR AN 411 exchange Radio Resource Control (RRC) signaling. Wireless 5GNR AN 411 and AMF 421 exchange N2 signaling. Wireless UE 401 and AMF 421 exchange N1 signaling over the RRC signaling and N2 signaling where the N1 signaling from UE 401 requests the H-PLMN. UE 401 requests the H-PLMN because the H-PLMN is available from AN 411 and has the highest priority in UE 401. AMF 421 authenticates UE 401 and authorizes UE 401 to use the H-PLMN. AMF 421 and SMF 423 exchange N11 signaling to establish context for UE 401. SMF 423 transfers the context to UPF 424 over N4 signaling. AMF 421 transfers the context to 5GNR AN 411 over N2 signaling. 5GNR AN 411 transfers the context to UE 401 over RRC signaling. UE 401 and 5GNR 411 exchange H-PLMN data over RRC. 5GNR 411 and UPF 424 exchange the H-PLMN data over N3. UPF 424 and external systems exchange the corresponding user data over N6.

Due to a signal strength difference, wireless UE 401 and 5GNR AN 411 exchange RRC signaling for a handover to 5GNR AN 412. 5GNR ANs 411-412 exchange X2 signaling for the handover. To complete the handover, UE 401 and 5GNR AN 412 exchange RRC signaling. Wireless 5GNR AN 412 and AMF 421 exchange N2 signaling. Wireless UE 401 and AMF 421 exchange N1 signaling over the RRC signaling and the N2 signaling where the N1 signaling from UE 401 requests the E-PLMN because the E-PLMN has the highest priority of available PLMNs (the higher-priority H-PLMN is not available from AN 412). AMF 421 authorizes UE 401 to use the E-PLMN. AMF 421 and SMF 423 exchange N11 signaling to update the context for UE 401. SMF 423 transfers the updated context to UPF 424 over N4 signaling. AMF 421 transfers the updated context to 5GNR AN 412 over N2 signaling. 5GNR AN 412 transfers the updated context to UE 401 over RRC signaling. Wireless UE 401 and AMF 421 exchange Tracking Area Update (TAU) signaling over the N1 that traverses AN 412 where the TAU signaling indicates the E-PLMN switch by UE 401. In response to the PLMN-switch, AMF 421 checks recent PLMN-switching by UE 401, but the amount of PLMN-switching in the past few seconds by UE 401 does not yet exceed the PLMN-switching threshold. UE 401 and 5GNR 412 exchange E-PLMN data over RRC. 5GNR 412 and UPF 424 exchange the E-PLMN data over N3. UPF 424 and external systems exchange the corresponding user data over N6.

Due to a signal strength difference, wireless UE 401 and 5GNR AN 412 exchange RRC signaling for a handover back to 5GNR AN 411. 5GNR ANs 411-412 exchange X2 signaling for the handover. To complete the handover, UE 401 and 5GNR AN 411 exchange RRC signaling. Wireless 5GNR AN 411 and AMF 421 exchange N2 signaling. Wireless UE 401 and AMF 421 exchange N1 signaling over the RRC signaling and the N2 signaling where the N1 signaling has an H-PLMN request from UE 401 because the H-PLMN is available from AN 411 and has the highest priority. Wireless UE 401 and AMF 421 exchange TAU signaling over the N1 that traverses AN 411 where the TAU signaling indicates the H-PLMN switch by UE 401. Although not shown, 5GNR 411 and UPF 424 may exchange H-PLMN data over N3, and UPF 424 and external systems may exchange the corresponding user data over N6. In response to the PLMN-switch, AMF 421 checks recent PLMN-switching by UE 401. The amount of PLMN-switching the past few seconds by UE 401 now exceeds the PLMN-switching threshold, and as a result, AMF 401 signals UE 401 over the N1 that traverses 5GNR AN 411 to temporarily remove the H-PLMN from the Handover Restriction List (HRL) until a return from idle mode.

To complete the handover, UE 401 and 5GNR AN 411 exchange RRC signaling. Wireless 5GNR AN 411 and AMF 421 exchange N2 signaling. Wireless UE 401 and AMF 421 exchange N1 signaling over the RRC signaling and the N2 signaling where the N1 signaling from UE 401 requests the E-PLMN because the E-PLMN has the highest priority of available PLMNs (the higher-priority H-PLMN is temporarily unavailable from AN 411). AMF 421 authorizes UE 401 to use the E-PLMN. AMF 421 and SMF 423 exchange N11 signaling to update the context for UE 401. SMF 423 transfers the updated context to UPF 424 over N4 signaling. AMF 421 transfers the updated context to 5GNR AN 412 over N2 signaling. 5GNR AN 412 transfers the updated context to UE 401 over RRC signaling. UE 401 and 5GNR 411 exchange E-PLMN data over RRC. 5GNR 411 and UPF 424 exchange the E-PLMN data over N3. UPF 424 and external systems exchange the corresponding user data over N6.

Due to a signal strength difference, wireless UE 401 and 5GNR AN 411 exchange RRC signaling for a handover to 5GNR AN 412. 5GNR ANs 411-412 exchange X2 signaling for the handover. To complete the handover, UE 401 and 5GNR AN 412 exchange RRC signaling. Wireless 5GNR AN 412 and AMF 421 exchange N2 signaling. Wireless UE 401 and AMF 421 exchange N1 signaling over the RRC signaling and the N2 signaling where the N1 signaling from UE 401 requests the E-PLMN because the E-PLMN has the highest priority of available PLMNs (the higher-priority H-PLMN is not available from AN 412 and is temporarily unavailable to UE 401). AMF 421 authorizes UE 401 to use the E-PLMN. AMF 421 and SMF 423 exchange N11 signaling to update the context for UE 401. SMF 423 transfers the updated context to UPF 424 over N4 signaling. AMF 421 transfers the updated context to 5GNR AN 412 over N2 signaling. 5GNR AN 412 transfers the updated context to UE 401 over RRC signaling. UE 401 and 5GNR 412 exchange E-PLMN data over RRC. 5GNR 412 and UPF 424 exchange the E-PLMN data over N3. UPF 424 and external systems exchange the corresponding user data over N6.

Due to a signal strength difference, wireless UE 401 and 5GNR AN 412 exchange RRC signaling for a handover back to 5GNR AN 411. 5GNR ANs 411-412 exchange X2 signaling for the handover. To complete the handover, UE 401 and 5GNR AN 411 exchange RRC signaling. Wireless 5GNR AN 411 and AMF 421 exchange N2 signaling. Wireless UE 401 and AMF 421 exchange N1 signaling over the RRC signaling and the N2 signaling where the N1 signaling has an E-PLMN request from UE 401 because the higher-priority H-PLMN is temporarily unavailable to UE 401. UE 401 and 5GNR 411 exchange E-PLMN data over RRC. 5GNR 411 and UPF 424 exchange the E-PLMN data over N3. UPF 424 and external systems exchange the corresponding user data over N6.

Eventually, UE 401 enters idle mode. UE 401 then returns from idle mode and the temporary restriction on the H-PLMN is gone from the HRL. UE 401 and 5GNR AN 411 exchange RRC signaling. Wireless 5GNR AN 411 and AMF 421 exchange N2 signaling. Wireless UE 401 and AMF 421 exchange N1 signaling over the RRC signaling and N2 signaling where the N1 signaling from UE 401 requests the H-PLMN because it is available again and has the highest priority. AMF 421 authorizes UE 401 to use the H-PLMN. AMF 421 and SMF 423 exchange N11 signaling to establish context for UE 401. SMF 423 transfers the context to UPF 424 over N4 signaling. AMF 421 transfers the context to 5GNR AN 411 over N2 signaling. 5GNR AN 4511 transfers the context to UE 401 over RRC signaling. UE 401 and 5GNR 411 exchange H-PLMN data over RRC. 5GNR 411 and UPF 424 exchange the H-PLMN data over N3. UPF 424 and external systems exchange the corresponding user data over N6.

Figure 10:
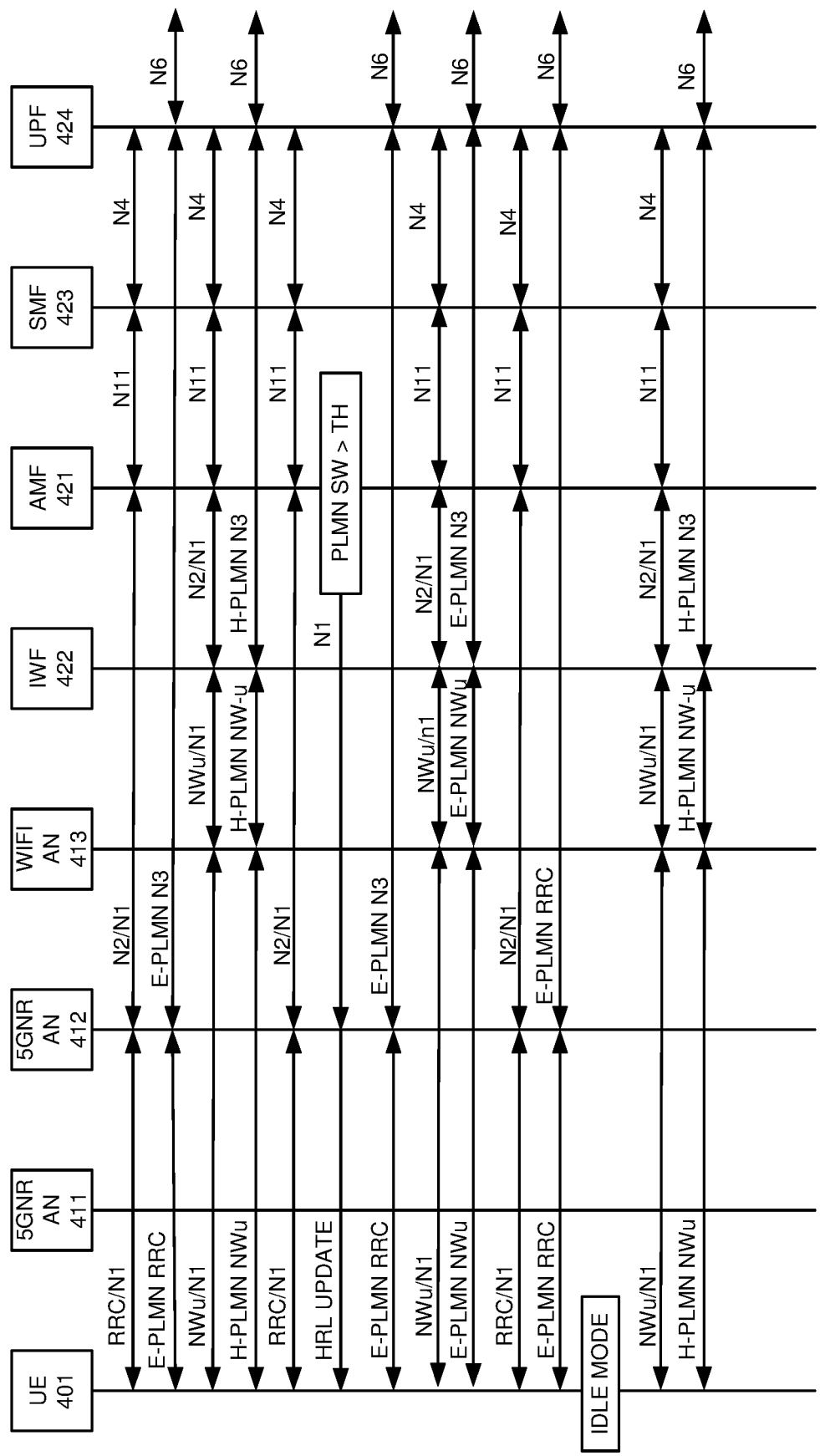
FIG. 10 illustrates an exemplary operation of the 5G communication network to serve the wireless UE over the H-PLMN and the E-PLMN.

FIG. 10 illustrates an exemplary operation of 5G communication network 400 to serve wireless UE 401 over the H-PLMN and the E-PLMN. The operation may vary in other examples. Wireless UE 401 and 5GNR AN 412 exchange RRC signaling. Wireless 5GNR AN 412 and AMF 421 exchange N2 signaling. Wireless UE 401 and AMF 421 exchange N1 signaling over the RRC signaling and N2 signaling where the N1 signaling from UE 401 requests the E-PLMN because the E-PLMN has the highest priority available from 5GNR AN 412 (AN 412 does not support the H-PLMN). AMF 421 authenticates UE 401 and authorizes UE 401 to use the E-PLMN. AMF 421 and SMF 423 exchange N11 signaling to establish context for UE 401. SMF 423 transfers the context to UPF 424 over N4 signaling. AMF 421 transfers the context to 5GNR AN 412 over N2 signaling. 5GNR AN 412 transfers the context to UE 401 over RRC signaling. UE 401 and 5GNR 412 exchange E-PLMN data over RRC. 5GNR 412 and UPF 424 exchange the E-PLMN data over N3. UPF 424 and external systems exchange the corresponding user data over N6.

Due to the signal strength difference, UE 401 and IWF 422 exchange NWu signaling over WIFI AN 413. IWF 422 and AMF 421 exchange N2 signaling. Wireless UE 401 and AMF 421 exchange N1 signaling over the N2 and NWu signaling where the N1 signaling from UE 401 requests the H-PLMN because the H-PLMN is available from IWF 422 and has the highest priority. AMF 421 authenticates UE 401 and authorizes UE 401 to use the H-PLMN. AMF 421 and SMF 423 exchange N11 signaling to establish context for UE 401. SMF 423 transfers the context to UPF 424 over N4 signaling. AMF 421 transfers the context to IWF 422 over N2 signaling. IWF 422 transfers the context to UE 401 over NWu signaling. Wireless UE 401 and AMF 421 exchange TAU signaling over the N1 that traverses IWF 422 where the TAU signaling indicates the H-PLMN switch by UE 401. In response to the PLMN-switch, AMF 421 checks recent PLMN-switching by UE 401. The amount PLMN-switching the past few seconds by UE 401 does not yet exceed the PLMN-switching threshold for the time-frame. UE 401 and IWF 421 exchange H-PLMN data over NWu. IWF 421 and UPF 424 exchange the H-PLMN data over N3. UPF 424 and external systems exchange the corresponding user data over N6.

Due to signal strength difference, UE 401 and 5GNR AN 412 exchange RRC signaling. 5GNR AN 412 and AMF 421 exchange N2 signaling. Wireless UE 401 and AMF 421 exchange N1 signaling over the RRC signaling and N2 signaling where the N1 signaling from UE 401 requests the E-PLMN because it has the highest priority available (the H-PLMN is not available from AN 412). AMF 421 authenticates UE 401 and authorizes UE 401 to use the E-PLMN. AMF 421 and SMF 423 exchange N11 signaling to establish context for UE 401. SMF 423 transfers the context to UPF 424 over N4 signaling. AMF 421 transfers the context to 5GNR AN 412 over N2 signaling. 5GNR AN 512 transfers the context to UE 401 over RRC signaling. Wireless UE 401 and AMF 421 exchange TAU signaling over the N1 that traverses 5GNR AN 412 where the TAU signaling indicates the E-PLMN switch by UE 401. In response to the PLMN-switch, AMF 421 checks recent PLMN-switching by UE 401. The amount PLMN-switching the past few seconds by UE 401 now exceeds the PLMN-switching threshold for the time-frame. As a result, AMF 401 signals UE 401 over the N1 that traverses 5GNR AN 412 to temporarily remove the higher-priority H-PLMN from the HRL until a return from idle mode. UE 401 and 5GNR 412 exchange E-PLMN data over RRC. 5GNR 412 and UPF 424 exchange the E-PLMN data over N3. UPF 424 and external systems exchange the corresponding user data over N6.

Due to signal strength difference, UE 401 and IWF 422 exchange NWu signaling over WIFI AN 413. IWF 422 and AMF 421 exchange N2 signaling. Wireless UE 401 and AMF 421 exchange N1 signaling over the N2 and NWu signaling where the N1 signaling from UE 401 requests the E-PLMN because it has the highest priority available (the H-PLMN is temporarily unavailable to UE 401). AMF 421 authenticates UE 401 and authorizes UE 401 to use the E-PLMN. AMF 421 and SMF 423 exchange N11 signaling to establish context for UE 401. SMF 423 transfers the context to UPF 424 over N4 signaling. AMF 421 transfers the context to IWF 422 over N2 signaling. IWF 422 transfers the context to UE 401 over NWu signaling. UE 401 and IWF 421 exchange E-PLMN data over NWu. IWF 421 and UPF 424 exchange the E-PLMN data over N3. UPF 424 and external systems exchange the corresponding user data over N6.

Due to signal strength difference, UE 401 and 5GNR AN 412 exchange RRC signaling. 5GNR AN 412 and AMF 421 exchange N2 signaling. Wireless UE 401 and AMF 421 exchange N1 signaling over the RRC signaling and N2 signaling where the N1 signaling from UE 401 requests the E-PLMN because it has the highest priority available (the H-PLMN is not available from AN 412). AMF 421 authenticates UE 401 and authorizes UE 401 to use the E-PLMN. AMF 421 and SMF 423 exchange N11 signaling to establish context for UE 401. SMF 423 transfers the context to UPF 424 over N4 signaling. AMF 421 transfers the context to 5GNR AN 412 over N2 signaling. 5GNR AN 512 transfers the context to UE 401 over RRC signaling. UE 401 and 5GNR 412 exchange E-PLMN data over RRC. 5GNR 412 and UPF 424 exchange the E-PLMN data over N3. UPF 424 and external systems exchange the corresponding user data over N6.

Eventually, UE 401 enters idle mode. UE 401 then returns from idle mode and the temporary restriction on the H-PLMN is removed from the HRL. UE 401 and IWF 422 exchange NWu signaling over WIFI AN 413. IWF 422 and AMF 421 exchange N2 signaling. Wireless UE 401 and AMF 421 exchange N1 signaling over the N2 and NWu signaling where the N1 signaling from UE 401 requests the H-PLMN because it again has the highest priority available. AMF 421 authenticates UE 401 and authorizes UE 401 to use the H-PLMN. AMF 421 and SMF 423 exchange N11 signaling to establish context for UE 401. SMF 423 transfers the context to UPF 424 over N4 signaling. AMF 421 transfers the context to IWF 422 over N2 signaling. IWF 422 transfers the context to UE 401 over NWu signaling. UE 401 and IWF 421 exchange H-PLMN data over NWu. IWF 421 and UPF 424 exchange the H-PLMN data over N3. UPF 424 and external systems exchange the corresponding user data over N6.

Figure 11:
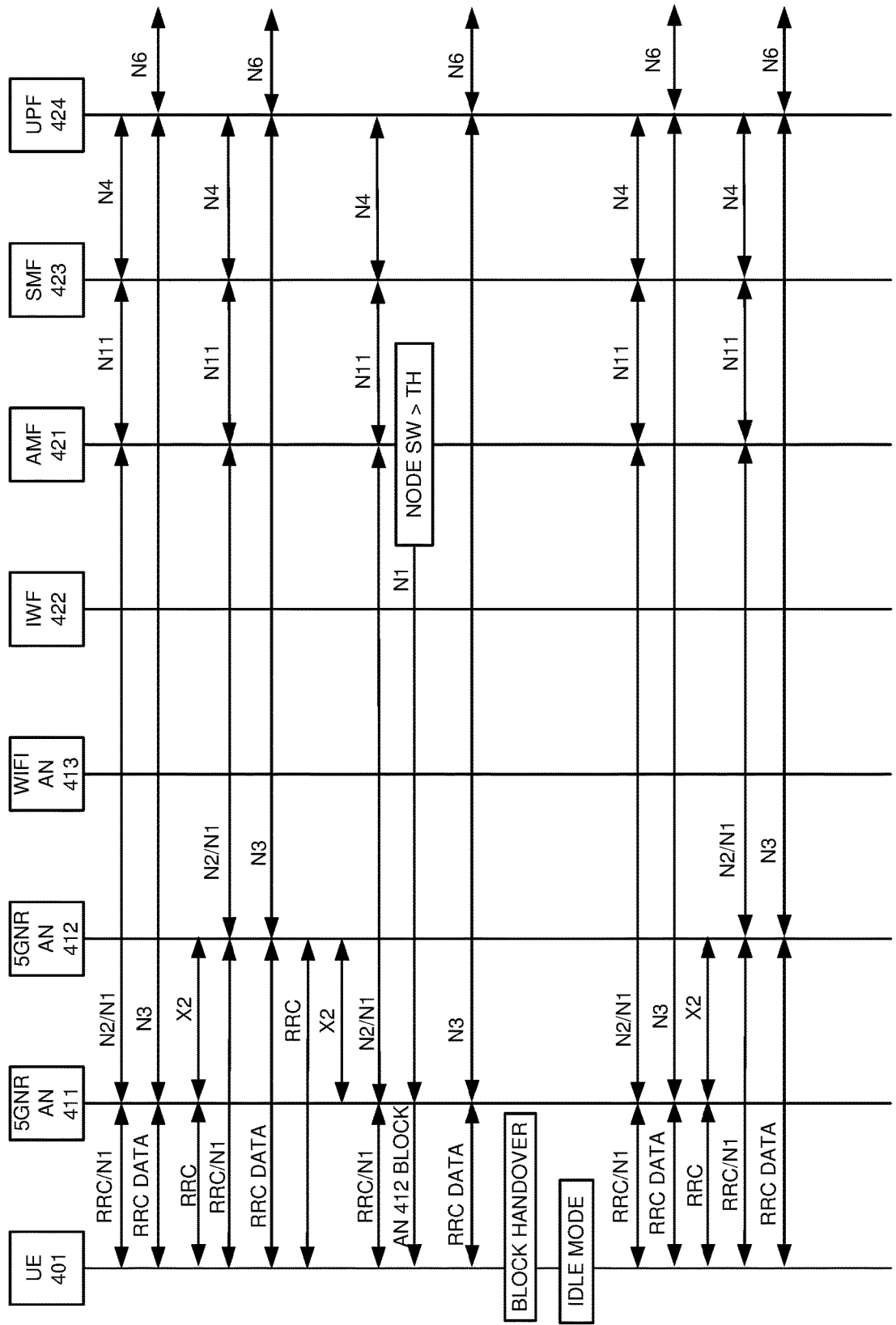
FIG. 11 illustrates an exemplary operation of the 5G communication network to serve the wireless UE over the H-PLMN and the E-PLMN.

FIG. 11 illustrates an exemplary operation of 5G communication network 400 to serve wireless UE 401 over the H-PLMN and the E-PLMN. The operation may vary in other examples. Wireless UE 401 and 5GNR AN 411 exchange RRC signaling. Wireless 5GNR AN 411 and AMF 421 exchange N2 signaling. Wireless UE 401 and AMF 421 exchange N1 signaling over the RRC signaling and N2 signaling. AMF 421 authenticates and authorizes UE 401. AMF 421 and SMF 423 exchange N11 signaling to establish context for UE 401. SMF 423 transfers the context to UPF 424 over N4 signaling. AMF 421 transfers the context to 5GNR AN 411 over N2 signaling. 5GNR AN 411 transfers the context to UE 401 over RRC signaling. UE 401 and 5GNR 411 exchange user data over RRC. 5GNR 411 and UPF 424 exchange the user data over N3. UPF 424 and external systems exchange the user data over N6.

Due to signal strength difference, wireless UE 401 and 5GNR AN 411 exchange RRC signaling for a handover to 5GNR AN 412. 5GNR ANs 411-412 exchange X2 signaling for the handover. To complete the handover, UE 401 and 5GNR AN 412 exchange RRC signaling. Wireless 5GNR AN 412 and AMF 421 exchange N2 signaling. Wireless UE 401 and AMF 421 exchange N1 signaling over the RRC signaling and the N2 signaling. AMF 421 and SMF 423 exchange N11 signaling to update the context for UE 401. SMF 423 transfers the updated context to UPF 424 over N4 signaling. AMF 421 transfers the updated context to 5GNR AN 412 over N2 signaling. 5GNR AN 412 transfers the updated context to UE 401 over RRC signaling. In response to the AN-switch, AMF 421 checks recent AN-switching by UE 401 in the past few seconds. The amount of AN-switching the past few seconds by UE 401 does not yet exceed the AN-switching threshold for the time-frame. UE 401 and 5GNR 412 exchange user data over RRC. 5GNR 412 and UPF 424 exchange the user data over N3. UPF 424 and external systems exchange the user data over N6.

Due to signal strength difference, wireless UE 401 and 5GNR AN 412 exchange RRC signaling for a handover back to 5GNR AN 411. 5GNR ANs 411-412 exchange X2 signaling for the handover. To complete the handover, UE 401 and 5GNR AN 411 exchange RRC signaling. Wireless 5GNR AN 411 and AMF 421 exchange N2 signaling. Wireless UE 401 and AMF 421 exchange N1 signaling over the RRC signaling and the N2 signaling. In response to the AN-switch, AMF 421 checks recent AN-switching by UE 401 in the past few seconds. The amount AN-switching the past few seconds by UE 401 now exceeds the AN-switching threshold for the time-frame, and as a result, AMF 401 signals UE 401 over the N1 that traverses 5GNR AN 411 to temporarily block handovers from 5GNR AN 411 to 5GNR AN 412 until a return from idle mode. AMF 421 and SMF 423 exchange N11 signaling to update the context for UE 401. SMF 423 transfers the updated context to UPF 424 over N4 signaling. AMF 421 transfers the updated context to 5GNR AN 412 over N2 signaling. 5GNR AN 412 transfers the updated context to UE 401 over RRC signaling. UE 401 temporarily blocks handovers from 5GNR AN 411 to 5GNR AN 412 until a return from idle mode.

Eventually, UE 401 enters idle mode. UE 401 then returns from idle mode and the handover restriction is removed. UE 401 and 5GNR AN 411 exchange RRC signaling. Wireless 5GNR AN 411 and AMF 421 exchange N2 signaling. Wireless UE 401 and AMF 421 exchange N1 signaling over the RRC signaling and N2 signaling. 421 and SMF 423 exchange N11 signaling to establish context for UE 401. SMF 423 transfers the context to UPF 424 over N4 signaling. AMF 421 transfers the context to 5GNR AN 411 over N2 signaling. 5GNR AN 4511 transfers the context to UE 401 over RRC signaling. UE 401 and 5GNR 411 exchange user data over RRC. 5GNR 411 and UPF 424 exchange the user data over N3. UPF 424 and external systems exchange the corresponding user data over N6.

Due to signal strength difference, wireless UE 401 and 5GNR AN 411 exchange RRC signaling for a handover to 5GNR AN 412. 5GNR ANs 411-412 exchange X2 signaling for the handover. UE 401 does not block the handover after the return from idle mode. To complete the handover, UE 401 and 5GNR AN 412 exchange RRC signaling. Wireless 5GNR AN 412 and AMF 421 exchange N2 signaling. Wireless UE 401 and AMF 421 exchange N1 signaling over the RRC signaling and the N2 signaling. AMF 421 and SMF 423 exchange N11 signaling to update the context for UE 401. SMF 423 transfers the updated context to UPF 424 over N4 signaling. AMF 421 transfers the updated context to 5GNR AN 412 over N2 signaling. 5GNR AN 412 transfers the updated context to UE 401 over RRC signaling. In response to the AN-switch, AMF 421 checks recent AN-switching by UE 401 in the past few seconds. The amount of AN-switching the past few seconds by UE 401 does not yet exceed the AN-switching threshold for the time-frame. UE 401 and 5GNR 412 exchange user data over RRC. 5GNR 412 and UPF 424 exchange the user data over N3. UPF 424 and external systems exchange the user data over N6.

Figure 12:
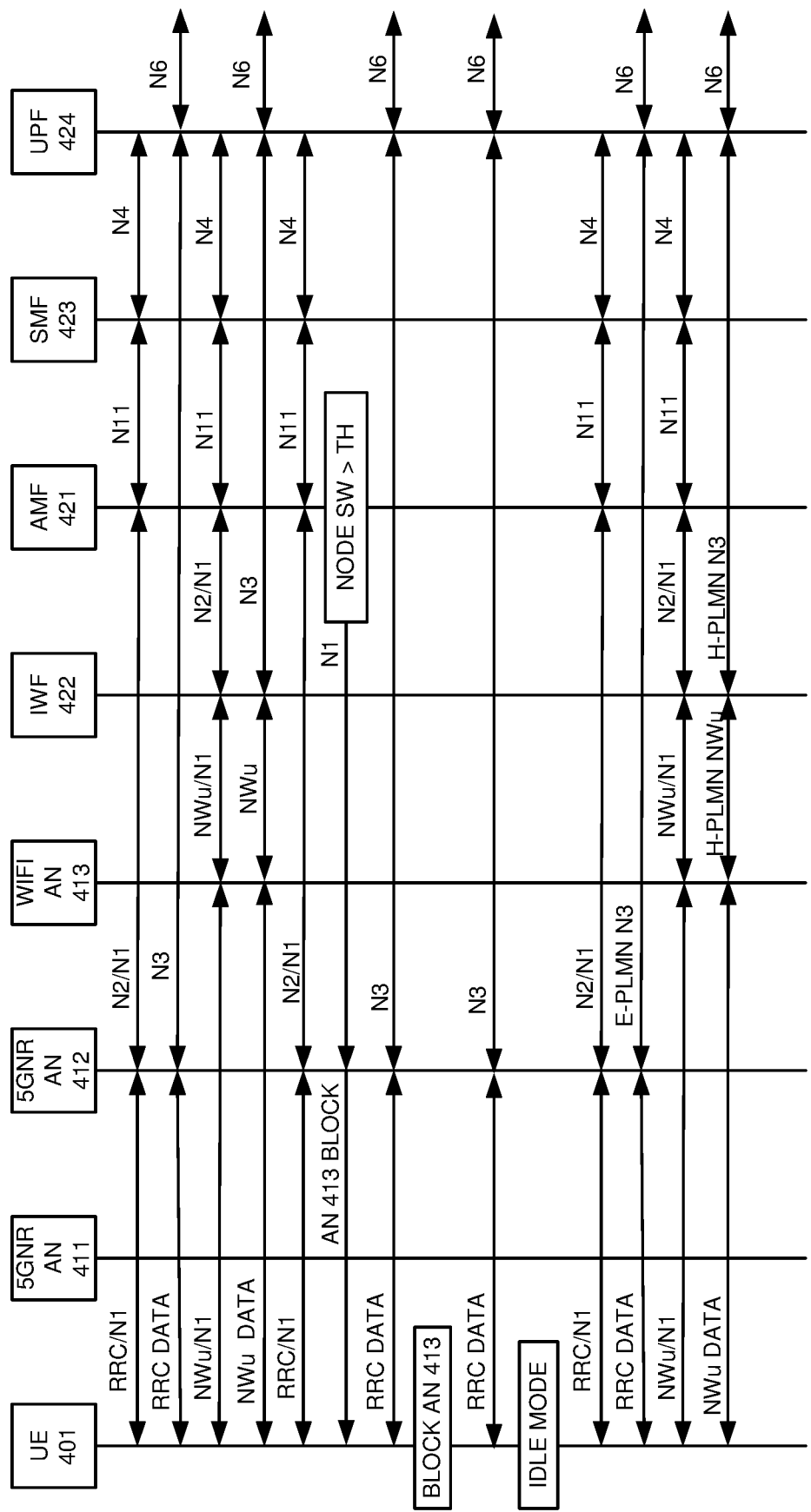
FIG. 12 illustrates an exemplary operation of the 5G communication network to serve the wireless UE over the H-PLMN and the E-PLMN.

FIG. 12 illustrates an exemplary operation of 5G communication network 400 to serve wireless UE 401 over the H-PLMN and the E-PLMN. The operation may vary in other examples. Wireless UE 401 and 5GNR AN 412 exchange RRC signaling. Wireless 5GNR AN 412 and AMF 421 exchange N2 signaling. Wireless UE 401 and AMF 421 exchange N1 signaling over the RRC signaling and N2 signaling. AMF 421 authenticates and authorizes UE 401. AMF 421 and SMF 423 exchange N11 signaling to establish context for UE 401. SMF 423 transfers the context to UPF 424 over N4 signaling. AMF 421 transfers the context to 5GNR AN 412 over N2 signaling. 5GNR AN 412 transfers the context to UE 401 over RRC signaling. UE 401 and 5GNR 412 exchange user data over RRC. 5GNR 412 and UPF 424 exchange the user data over N3. UPF 424 and external systems exchange the user data over N6.

Due signal strength difference, UE 401 and IWF 422 exchange NWu signaling over WIFI AN 413. IWF 422 and AMF 421 exchange N2 signaling. Wireless UE 401 and AMF 421 exchange N1 signaling over the N2 and NWu signaling. AMF 421 authenticates and authorizes UE 401. AMF 421 and SMF 423 exchange N11 signaling to establish context for UE 401. SMF 423 transfers the context to UPF 424 over N4 signaling. AMF 421 transfers the context to IWF 422 over N2 signaling. IWF 422 transfers the context to UE 401 over NWu signaling. In response to the AN-switch, AMF 421 checks recent AN-switching by UE 401 in the past few seconds. The amount of AN-switching the past few seconds by UE 401 does not yet exceed the AN-switching threshold for the time-frame. UE 401 and IWF 421 exchange user data over NWu. IWF 421 and UPF 424 exchange the user data over N3. UPF 424 and external systems exchange the user data over N6.

Due to signal strength difference, UE 401 and 5GNR AN 412 exchange RRC signaling. 5GNR AN 412 and AMF 421 exchange N2 signaling. Wireless UE 401 and AMF 421 exchange N1 signaling over the RRC signaling and N2 signaling. AMF 421 authenticates UE 401 and authorizes UE 401. AMF 421 and SMF 423 exchange N11 signaling to establish context for UE 401. SMF 423 transfers the context to UPF 424 over N4 signaling. AMF 421 transfers the context to 5GNR AN 412 over N2 signaling. 5GNR AN 512 transfers the context to UE 401 over RRC signaling. In response to the AN-switch, AMF 421 checks recent AN-switching by UE 401 in the past few seconds. The amount AN-switching the past few seconds by UE 401 now exceeds the AN-switching threshold for the time-frame. As a result, AMF 401 signals UE 401 over the N1 that traverses 5GNR AN 412 to temporarily block handovers to from 5GNR 412 to WIFI AN 413 until a return from idle mode. UE 401 temporarily blocks handovers to from 5GNR AN 412 to WIFI AN 413 until a return from idle mode. UE 401 and 5GNR 412 exchange user data over RRC. 5GNR 412 and UPF 424 exchange the user data over N3. UPF 424 and external systems exchange the user data over N6.

Eventually, UE 401 enters idle mode. UE 401 then returns from idle mode and the temporary restriction on handovers from 5GNR AN 412 to WIFI AN 413 are removed. Wireless UE 401 and 5GNR AN 412 exchange RRC signaling. Wireless 5GNR AN 412 and AMF 421 exchange N2 signaling. Wireless UE 401 and AMF 421 exchange N1 signaling over the RRC signaling and N2 signaling. AMF 421 and SMF 423 exchange N11 signaling to establish context for UE 401. SMF 423 transfers the context to UPF 424 over N4 signaling. AMF 421 transfers the context to 5GNR AN 412 over N2 signaling. 5GNR AN 412 transfers the context to UE 401 over RRC signaling. UE 401 and 5GNR 412 exchange user data over RRC. 5GNR 412 and UPF 424 exchange the user data over N3. UPF 424 and external systems exchange the user data over N6.

Due to signal strength difference, UE 401 and IWF 422 exchange NWu signaling over WIFI AN 413. IWF 422 and AMF 421 exchange N2 signaling. Wireless UE 401 and AMF 421 exchange N1 signaling over the N2 and NWu signaling. AMF 421 authenticates and authorizes UE 401. AMF 421 and SMF 423 exchange N11 signaling to establish context for UE 401. SMF 423 transfers the context to UPF 424 over N4 signaling. AMF 421 transfers the context to IWF 422 over N2 signaling. IWF 422 transfers the context to UE 401 over NWu signaling. In response to the AN-switch, AMF 421 checks recent AN-switching by UE 401 in the past few seconds. The amount of AN-switching the past few seconds by UE 401 does not yet exceed the AN-switching threshold for the time-frame. UE 401 and IWF 421 exchange user data over NWu. IWF 421 and UPF 424 exchange the user data over N3. UPF 424 and external systems exchange the user data over N6.

The wireless data network circuitry described above comprises computer hardware and software that form special-purpose network circuitry to serve wireless UEs over PLMNs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve wireless UEs over PLMNs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve a wireless User Equipment (UE) over a higher-priority Public Land Mobile Network (PLMN) and a lower-priority PLMN, the method comprising:
    a wireless access node exchanging wireless communications with the wireless UE over the higher-priority PLMN;
    another access node exchanging other communications with the wireless UE over the lower-priority PLMN, wherein the wireless UE switches between the higher-priority PLMN at the wireless access node and the lower-priority PLMN at the other access node;
a network controller detecting excessive PLMN-switching between the higher-priority PLMN and the lower-priority PLMN by wireless UE and responsively signaling the wireless UE to avoid the higher-priority PLMN until the wireless UE returns from idle mode; and
the other access node exchanging additional communications with the wireless UE over the lower-priority PLMN until the wireless UE enters the idle mode.

2. The method of claim 1 wherein the network controller signaling the wireless UE to avoid the higher-priority PLMN until the wireless UE returns from the idle mode comprises signaling the wireless UE to remove the higher-priority PLMN from a Handover Restriction List (HRL) until the wireless UE returns from the idle mode.

3. The method of claim 1 wherein the network controller detecting the excessive PLMN-switching between the higher-priority PLMN and the lower-priority PLMN by the wireless UE comprises processing Tracking Area Updates (TAUs) from the wireless UE.

4. The method of claim 1 wherein the network controller detecting the excessive PLMN-switching between the higher-priority PLMN and the lower-priority PLMN by the wireless UE comprises comparing a PLMN-switching threshold to an amount of the PLMN-switching by the wireless UE during a measurement time period.

5. The method of claim 1 wherein the higher-priority PLMN comprises a Home PLMN (H-PLMN) for the wireless UE and the lower-priority PLMN comprises an Equivalent PLMN (E-PLMN) for the wireless UE.

6. The method of claim 1 further comprising the wireless access node exchanging subsequent communications with the wireless UE over the higher-priority PLMN after the wireless UE returns from the idle mode.

7. The method of claim 1 further comprising the network controller detecting excessive node-switching between the wireless access node and the other access node by the wireless UE and responsively signaling the wireless UE to stop the node-switching until the wireless UE returns from the idle mode.

8. The method of claim 1 wherein the network controller comprises an Access and Mobility Management Function (AMF).

9. The method of claim 1 wherein the network controller comprises a Mobility Management Entity (MME).

10. The method of claim 1 wherein the wireless access node comprises a macrocell access node and the other access node comprises a femtocell access node.

11. A wireless communication network to serve a wireless User Equipment (UE) over a higher-priority Public Land Mobile Network (PLMN) and a lower-priority PLMN, the wireless communication network comprising:
a wireless access node configured to exchange wireless communications with the wireless UE over the higher-priority PLMN;
another access node configured to exchange other communications with the wireless UE over the lower-priority PLMN, wherein the wireless UE is configured to switch between the higher-priority PLMN at the wireless access node and the lower-priority PLMN at the other access node;
a network controller configured to detect excessive PLMN-switching between the higher-priority PLMN and the lower-priority PLMN by wireless UE and responsively signal the wireless UE to avoid the higher-priority PLMN until the wireless UE returns from idle mode; and
the other access node configured to exchange more communications with the wireless UE over the lower-priority PLMN until the wireless UE enters the idle mode.

12. The wireless communication network of claim 11 wherein the network controller is configured to signal the wireless UE to remove the higher-priority PLMN from a Handover Restriction List (HRL) until the wireless UE returns from the idle mode to signal the wireless UE to avoid the higher-priority PLMN until the wireless UE returns from the idle mode.

13. The wireless communication network of claim 11 wherein the network controller is configured to process Tracking Area Updates (TAUs) from the wireless UE to detect the excessive PLMN-switching between the higher-priority PLMN and the lower-priority PLMN by the wireless UE.

14. The wireless communication network of claim 11 wherein the network controller is configured to compare a PLMN-switching threshold to an amount of the PLMN-switching by the wireless UE during a measurement time period to detect the excessive PLMN-switching between the higher-priority PLMN and the lower-priority PLMN by the wireless UE.

15. The wireless communication network of claim 11 wherein the higher-priority PLMN comprises a Home PLMN (H-PLMN) for the wireless UE and the lower-priority PLMN comprises an Equivalent PLMN (E-PLMN) for the wireless UE.

16. The wireless communication network of claim 11 further comprising the wireless access node configured to exchange subsequent communications with the wireless UE over the higher-priority PLMN after the wireless UE returns from the idle mode.

17. The wireless communication network of claim 11 further comprising the network controller configured to detect excessive node-switching between the wireless access node and the other access node by the wireless UE and responsively signal the wireless UE to stop the node-switching until the wireless UE returns from the idle mode.

18. The wireless communication network of claim 11 wherein the network controller comprises an Access and Mobility Management Function (AMF).

19. The wireless communication network of claim 11 wherein the network controller comprises a Mobility Management Entity (MME).

20. The wireless communication network of claim 11 wherein the wireless access node comprises a macrocell access node and the other access node comprises a femtocell access node.

* * * * *